United States Patent [19]
Mandish

[11] 3,875,590
[45] Apr. 1, 1975

[54] TAPE TRANSPORT ARRANGEMENT FOR CASSETTES WITH INTERLOCKS TO PREVENT TAPE DAMAGE

[75] Inventor: John Jerome Mandish, Huntington Beach, Calif.

[73] Assignee: John Jazina, Los Angeles, Calif.

[22] Filed: Sept. 25, 1972

[21] Appl. No.: 292,181

[52] U.S. Cl. .................... 360/96, 242/199, 360/93, 360/105, 360/130

[51] Int. Cl. .... G11b 5/54, G11b 15/24, G11b 23/04

[58] Field of Search ......... 360/105, 93, 96, 130, 74, 360/90; 242/197–200

[56] References Cited

UNITED STATES PATENTS

| | | | |
|---|---|---|---|
| 2,484,097 | 10/1949 | Keller et al. | 360/130 |
| 3,417,938 | 12/1968 | Markakis et al. | 360/130 |
| 3,521,009 | 7/1970 | Auld | 360/93 |
| 3,601,409 | 8/1971 | Johnson et al. | 360/130 |
| 3,614,109 | 10/1971 | Yamamoto et al. | 242/199 |
| 3,638,953 | 2/1972 | Kodama et al. | 242/199 |

*Primary Examiner*—Alfred H. Eddleman
*Attorney, Agent, or Firm*—Don B. Finkelstein

[57] ABSTRACT

A tape transport arrangement for tape cassettes. A main frame is provided and a cassette well is movably mounted upon the main frame for reciprocating movement in a first direction. A tape cassette of standard configuration is removably insertable in the cassette well. The cassette well is spring biased for movement into a tape cassette insertion removal position and yieldingly resists motion from the tape cassette insertion removal position towards a tape read-write position. For the cassette well in the read-write position a tape cassette is mounted therein in a predetermined location and is in engagement with the tape drive means coupled to the main frame. A carriage means is also movably mounted on the main frame for reciprocating motion in directions perpendicular to the direction of motion of the cassette well and is spring biased for movement into a read-write position thereof and yieldingly resists motion from the read-write position to a retracted position. A latch means is provided for retaining the cassette well in the read-write position thereof and carriage motion limiting means are provided to prevent the movement of the carriage from the retracted position to the read-write position if the cassette well is in the tape cassette insertion removal position. The latch means is not activated until the carriage means has moved from the read-write position to the retracted position wherein it is free of contact with the tape in the tape cassette. When the carriage means is in the retracted position the latch means are unlatched and the cassette well is free to move from the read-write position to the tape cassette insertion removal position. Means are also provided for only permitting movement of the carriage means from the retracted position into the read-write position for the condition of the cassette well in the read-write position. As a result of the spring bias of both the cassette well and the carriage means only one hand is needed for manual operation of the tape transport arrangement for inserting the tape cassette therein and placing the tape transport arrangement into an operational read-write condition as well as changing the tape transport arrangement from the operational read-write condition to the condition wherein a tape cassette may be removed and/or inserted.

21 Claims, 9 Drawing Figures

TAPE TRANSPORT ARRANGEMENT FOR CASSETTES WITH INTERLOCKS TO PREVENT TAPE DAMAGE

BACKGROUND OF THE INVENTION

1. Field of the Invention

This invention relates to the tape transport art and more particularly to an improved tape cassette transport arrangement.

2. Description of the Prior Art

Increased utilization of tape cassettes for industrial applications has resulted in standardization of tape cassette design and design performance. That is, tape cassettes are utilized in great numbers in various computer applications, data storage and retrieval applications and data transfer applications. In order to ensure uniformity of data information and retrieval characteristics the tape cassettes have been comparatively standardized both as to physical configuration and performance. For example, standards such as those established by ECMA providing the standardized Phillips type cassette and tape performance characteristics, or ANSI standards ensure high reliability and reproducibility in the tape and tape cassette.

Since the information encoded on the tape in the tape cassettes when utilized in such industrial applications is usually in binary format such as NRZ or PE it is naturally desired to have the greatest number of characters per unit length available on the tape. Thus, for example, with PE there are generally two tracks currently available, though standardizations for greater than two tracks on a single tape are in process, and such two track PE provides up to 1,600 fci, and similarly, up to 800 bbi for NRZ on a single track. This high density data bit capacity on the tapes necessarily requires comparatively high performance tape transports for providing the read-write function onto or from the tapes such that all data bits are suitably encoded and all data bits are suitably read when the tape cassettes are utilized.

Further, the tape transport arrangement for providing the read-write function must be interchangeable so that tape cassettes encoded at one location may be reliably read when utilized on another tape transport at a remote location. As such, there must be precision positioning of the cassette in the tape transport and precision positioning of the read-write head adjacent to the tape. Such positioning must, of course, be uniform in all tape transports in order to provide the high reliability read-write functions.

While many advances have been made in the tape read-write electronic circuitry in order to provide high performance read-write functions and many advances have been made in the tape drive and tape speed control arrangements for providing precision drive of the tape in the tape cassette, generally the structure providing the mechanical positioning of the tape cassette in the tape transport and the positioning of the read-write head adjacent to the tape in the tape cassette have merely been adaptations of the commercially available tape transports utilized in audio recording-playback for music or the like. As such, the tape transports so adapted do not provide the ruggedness, reliability and precision required in industrial applications for the read-write of digital information on the tape. For example, the various components associated with the tape drive and/or the tape read-write electronics and tape guide structure are often mounted on a comparatively large plurality of structural supporting elements. As such, precision alignment of the read-write head with the tape in the tape cassette is difficult to achieve because of distortions in the structure and/or tolerance build-up between the various supporting structural elements. Therefore, such tape transports often require frequent field adjustments to maintain the operational characteristics thereof in satisfactory condition. If the field adjustments were not frequently made, data bits on the tape are often missed during the read-write function. Further, the field adjustments necessary resulted in a comparatively high amount of down time wherein the tape transport arrangement was not operational.

Additionally, in other tape transports unless extreme care is taken during the insertion and removal of the tape it is often possible to damage and/or rip the tape on the tape read-write head or other tape guide structure since no automatic retraction of the tape guides and/or tape head from contact with the tape is made prior to movement of the tape cassette itself during insertion and/or removal.

In yet other tape transports two separate operations requiring the utilization of two hands are required in order to retract the tape guide and tape read-write head and insert or remove the tape cassette.

Thus, there is needed a tape transport arrangement that provides high reliability for read-write functions on a tape contained within a standardized tape cassette, that is comparatively easy to operate and ruggedly built for comparatively long operational life. Further, such an improved tape transport arrangement must incorporate positive interlocking structural arrangements to ensure that the tape guide and tape head are free of contact with the tape whenever the tape cassette is moved.

SUMMARY OF THE INVENTION

Accordingly, it is an object of the present invention to provide an improved tape transport arrangement.

It is another object of the present invention to provide an improved tape transport arrangement in which interlocks are incorporated to prevent any possibility of damage to the tape by the tape transport structure.

It is another object of the present invention to provide an improved tape transport arrangement that is easily operable by one hand for installation and/or removal of a standardized tape cassette.

In many of the prior art tape transports arcuate motion was utilized for either or both of the tape cassette holding structure and tape read-write structure during transition from a read-write condition wherein the date was encoded or decoded from the tape in the tape cassette to a reloading position wherein the tape cassette could be removed and/or installed. Such arcuate motion is difficult to control to the high degree of precision necessary to ensure completely satisfactory tape read-write function in the read-write mode and also ensure complete freedom of the tape cassette during installation and removal from contact with the read-write structure.

Therefore, according to a preferred embodiment of the present invention, there is provided a main frame upon which a cassette well is movably mounted. The cassette well moves in a reciprocating motion between a tape cassette insertion-removal position and a read-write position along a first linear axis. A tape cassette is removably installable in the cassette well and tape cassette retaining means are provided for repetitively positioning standardized tape cassettes in a predetermined position in the cassette well.

A carriage means is also movably mounted on the main frame for reciprocating motion along a second linear axis perpendicular to the first linear axis and between a retracted position and a read-write position thereof.

All of the tape drive structure, which does not form a part of the present invention, is mounted on the main frame and engages the tape cassette to drive the tape therein for the condition of the cassette well in the read-write position. When the cassette well is in the tape cassette insertion-removal position it is free of any contact with the tape drive means.

Tape read-write means including the read-write head, tape guide and all necessary electronics for providing the read-write function are mounted on the carriage means and move therewith along the second linear axis. A carriage motion stop means is provided on the main frame to limit the movement of the carriage means in the carriage read-write position thereof to a predetermined location with respect to the position of the tape in the tape cassette. This ensures that the read-write head is properly positioned with precisely the exact pressure required against the tape to provide completely reliable tape read-write functional characteristics thereof.

Interlocking means are incorporated for operatively engaging both the cassette well and the carriage means and the interlocking means prevent motion of the cassette well for the condition of the carriage means in the read-write position thereof. That is, when the carriage means is in the read-write position the read-write head, tape guides, pinch rollers and the like that are mounted on the carriage means engage the tape in the tape cassette. As long as the carriage means is in the read-write position the cassette well is locked in the read-write position and cannot be moved. This prevents tearing or damage to the tape because of inadvertent movement thereof while the carriage means is in the read-write position.

In order to provide one hand operation, cassette well spring means is provided for biasing the cassette well into the tape cassette insertion-removal position and for yieldingly resisting movement of the cassette well along the first linear axis from the tape cassette insertion removal position towards the read-write position thereof. Similarly, carriage spring means is provided for yieldingly urging the carriage means into the retracted position thereof and yieldingly resisting motion of the carriage means from the retracted position to the read-write position thereof.

The interlocking means comprises both latch means and retaining means for retaining the cassette well in the read-write position. Latch release means are incorporated and trip the latches to allow movement of the cassette well from the read-write position to the tape cassette insertion-removal position simultaneously with release of the retaining means and only for the condition of the carriage means moved from the read-write position thereof to the retracted position thereof. The interlocking means also comprises a carriage motion limiting means to prevent the carriage means from moving from the retracted position to the read-write position thereof for the condition of the cassette well not in the read-write position thereof.

The above described mounting arrangement for the components of the tape transport eliminate the necessity for any field adjustments and provides a comparitively long service life.

BRIEF DESCRIPTION OF THE DRAWINGS

The above and other objects of the present invention may be more fully understood from the following detailed description taken together with the accompanying drawings wherein similar reference characters refer to similar elements throughout and in which.

DESCRIPTION OF THE PREFERRED EMBODIMENTS

Figure 1:
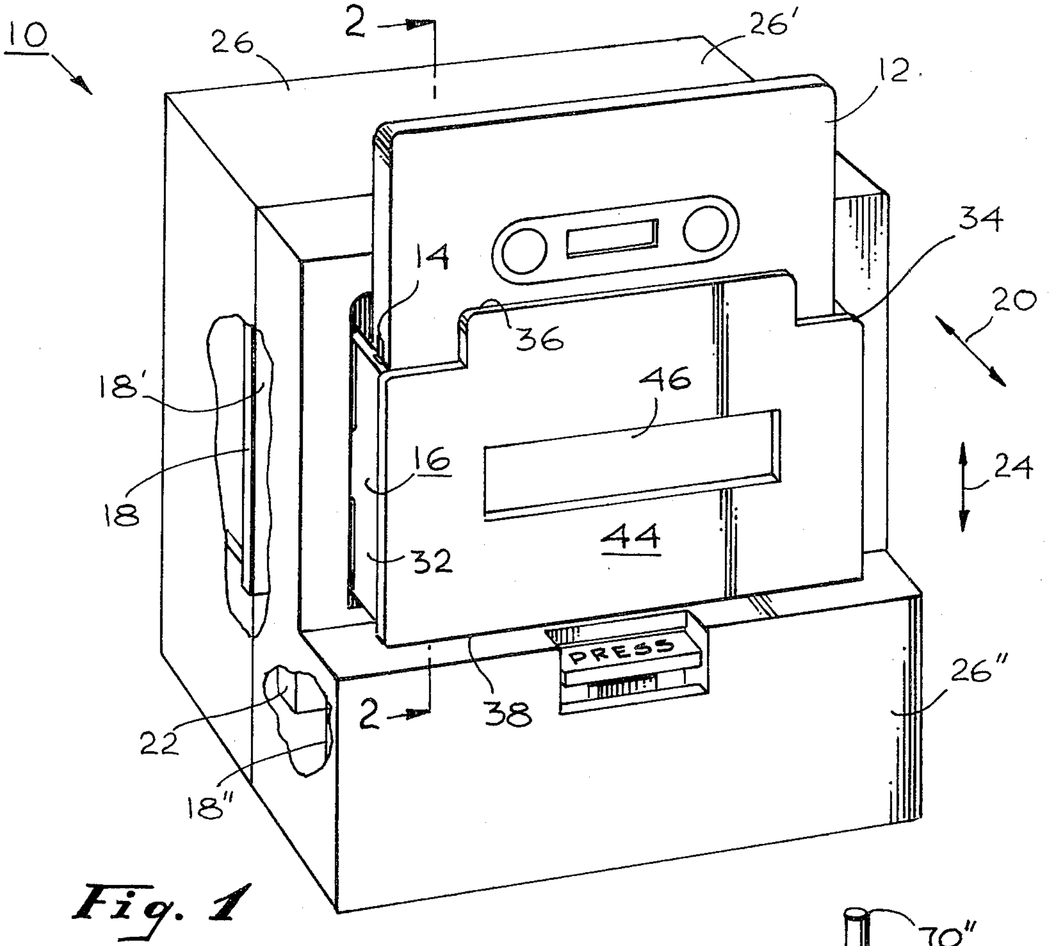
FIG. 1 is a perspective view of one embodiment of the present invention.

Referring now to FIG. 1 there is shown a perspective view of one embodiment, generally designated 10, of the structure in a preferred arrangement of the present tape cassette transport for utilization with a standardized tape cassette 12. The tape cassette 12 may be of the standardized Phillips type tape cassette and the tape contained therein may have tape performance characteristics as established by ECMA, ANSI, or the like. The tape cassette 12 is provided with guide lips 14 on each side of the tape cassette which, as described below in greater detail, provide initial positioning of the tape cassette 12 in a cassette well 16. The cassette well 16 is movably mounted on a main frame 18 in a cassette well mounting portion 18' thereof for reciprocating motion between a tape cassette insertion removal position, as shown on FIG. 1 and a read-write position, described below in greater detail, along a first linear axis 20.

A carriage means 22 is also movably mounted on the main frame 18 in a carriage mounting portion 18'' thereof for reciprocating motion towards and away from the cassette well 16 and between a retracted position, shown in FIG. 1 and a read-write position, described below in greater detail wherein the carriage means is in read-write relationship to the tape cassette 12 for the condition of the cassette 16 in the read-write position thereof. The carriage means 22 moves reciprocatingly along a seond linear axis 24 which, in the preferred embodiment 10 of the present invention is in a direction from the first linear axis 20 and is preferably substantially perpendicular thereto.

A cover means 26 having a back portion 26' and a front portion 26'' is coupled to the main frame 18 on the external surfaces thereof.

Figure 2:
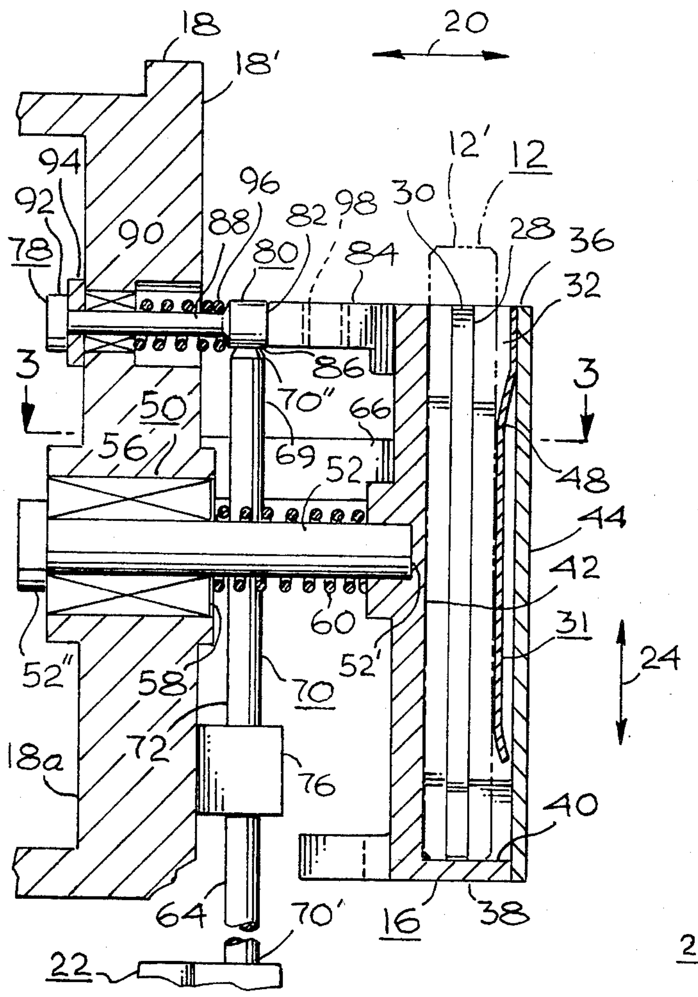
FIG. 2 is a sectional view of a portion of the embodiment of the invention shown in FIG. 1.

FIG. 2 is a sectional view along the line 2—2 of FIG. 1 illustrating the mounting of the cassette well 16 on the main frame 18 in the cassette well mounting portion 18' thereof on the cassette retaining means 31. The cassette retaining means 31 ensures proper, positive positioning of the tape cassette 12 in the cassette well 16.

FIG. 2 illustrates the cassette well 16 in the tape cassette insertion removal position thereof and the tape cassette 12 is shown, for clarity, in dash-dot lines thereon. The cassette well 16 is provided with first walls 28 defining a guide lip accepting groove 30 extending along the sides 32 and 34. The tape cassette 12 is removably mountable in the carriage well 16 by insertion of the guide lips 14 in the grooves 30 thereof as shown in FIG. 1. The tape cassette 12 is moved into the cassette well 16 from the outer end 36 thereof to the closed end 38 until the tape cassette 12 abuts against a tape cassette bearing wall 40 at the closed end 38. The tape cassette 12 also slidingly engages a tape cassette bearing surface 42 that extends from the tape cassette bearing wall 40.

The cassette well 16 is also provided with a cassette cover means 44 in which, as shown on FIG. 1, there is provided a window, such as a transparent Lexan window 46, through which the pertinent data such as feet remaining on the tape in the tape cassette 16, or the like, may be viewed. Spring means 48 which, for example, may be a leaf spring, is coupled to the cover 44 and bears against the tape cassette 12 yieldingly urging the tape cassette 12 into sliding frictional engagement with the bearing surface 42.

Figure 3:
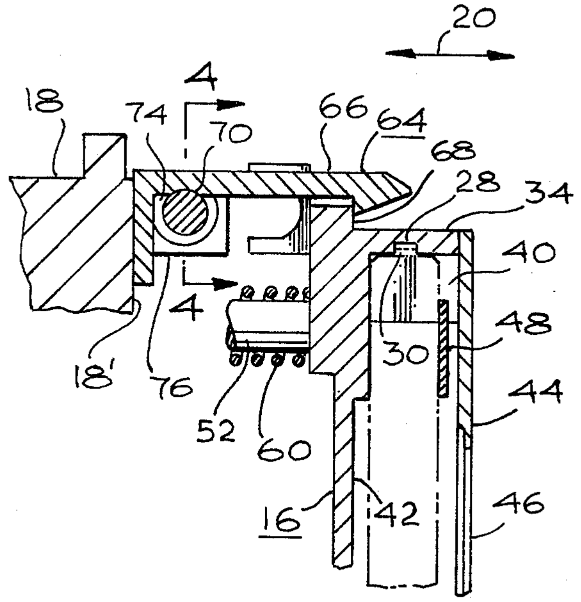
FIG. 3 is a sectional view along the line 3—3 of FIG. 2.

As described below in greater detail, when the cassette well 16 is moved from the cassette insertion removal position, shown in FIG. 2, along the first linear axis 20 to the read-write position thereof, as shown in FIG. 3, post means mounted on the main frame 18 in the cassette well mounting portion 18' thereof frictionally engage the cassette 12 at its outer end 12' for pressing the cassette 12 into abutment with the cassette bearing wall 40.

The above-described cassette retaining means ensures proper positioning of the tape cassette 12 in the cassette well 16. Due to the high precision necessary for proper read-write functions, accurate positioning of the tape cassette 12 is required.

Carriage guide means, generally designated 50, operatively engages both the main frame 18 in the cassette well mounting portion 18' thereof and the cassette well 16 for controlling movement of the cassette well 16 along the first linear axis 20. The cassette well guide means 50 generally comprises cassette well shaft means 52 coupled at a first end 52' thereof to the cassette well 16 and extending in directions parallel to the first linear axis 20 through the main frame 18 to a second end 52'' provided with a head portion 54. Cassette well shaft means 52 extends through cassette well bearing means 56 mounted in the main frame 18 and retained therein by a cassette well bearing retainer means 58. Because of the precision required for positioning of the tape cassette 12 in the read-write position of the cassette well 16 the cassette well bearing means 56 as well as the cassette shaft means 52 are selected to provide motion substantially parallel to the first linear axis 20. For example, it has been found that the parallelism of this motion along directions parallel to the first linear axis 20 may be maintained to have not greater than 12 minutes of arc azimuth and zenith deviation per inch of travel.

A cassette well spring means 60 operatively engages the cassette well 16 and the main frame 18 and yieldingly urges the cassette well into the tape cassette insertion removal position thereof, shown on FIG. 2, and yieldingly resiliently resists movement of the cassette well from the tape cassette insertion and removal position towards the read-write position thereof when the tape cassette well 16 moves towards the main frame 18.

It will be appreciated that other forms of structure for guiding the cassette well 16 during movement in directions parallel to the first linear axis 20 may be utilized in other embodiments of the present invention. For example, there might be provided a shoulder type extension on the cassette well 16 extending parallel to the direction of the first linear axis 20 and a corresponding groove means in the main frame 18 for accepting the shoulder means to provide the guiding action. Similarly, other forms of structure may be utilized by those skilled in the art to provide, in other embodiments, the necessary control of the movement of the cassette well 16.

In the preferred embodiment 10 of the present invention the cassette well guide means 50, described above, is provided adjacent both the first side 32 and second side 34 of the cassette well 16. The head portion 54 on the cassette well shaft means 52 limits the travel of the cassette well 16 from the read-write position thereof to the tape cassette insertion removal position thereof by abutting against the cassette well bearing means 56 and thus prevents the cassette well 16 from being completely removed from the main frame 18.

An interlock means generally designated 64 is provided and operatively engages both the cassette well 16 and carriage means 22 and prevents motion of the cassette well along the first linear axis 20 for the condition of the carriage means 22 in the read-write position thereof. As described below in greater detail interlock means 64 also prevents movement of the carriage means 22 into the read-write position thereof for the condition of the cassette well 16 in a position other than the read-write position thereof. The interlock means 64 comprises a latch means 66 coupled to the main frame 18 in the cassette well mounting portion 18' thereof and operatively engages the cassette well 16 in a latched position for restraining the cassette well in the read-write position thereof. As shown most clearly in FIG. 3, which illustrates the cassette well 16 in the read-write position thereof, the latch means 66 is resiliently flexible and is yieldingly urged into the latched position wherein it engages a lip means 68 on the cassette well 16 for retaining the cassette well 16 in the read-write position. A similar latch means 66 and lip means 68 is provided on the second side 34 of the cassette well 16.

The latch means 66 yieldingly resists motion to an unlatched position wherein it is free of contact with the lip means 68 and is biased to retrun to the latched position. When the latch means 66 is in the unlatched position the cassette well 16 is free to move in the direction of the first linear axis 20 under the influence of cassette well spring means 60 from the read-write position thereof, as shown in FIG. 3, to the tape cassette insertion removal position shown in FIG. 2.

In order to prevent damage to the tape in the tape cassette 12 by the structure associated with the tape guide and read-write head, the present invention also comprises, as part of the interlock means 64, structure for ensuring that the tape in the tape cassette 12 is free of contact with other structure during motion between the read-write position and the tape cassette insertion removal position. Thus, the interlock means 64 also comprises a retaining means 69 in which there is a lock shaft 70 coupled to the carriage means 22 at a first end 70' thereof and a second end 70'' spaced a preselected distance from the first end 70' and comprises a body portion 72 intermediate the first end 70' and second end 70''. The lock shaft 70 is movable with the carriage means 22 in the direction of the second linear axis 24. The lock shaft 70 extends through a bushing 74 in a boss 76 mounted on the main frame 18 in regions adjacent the carriage well mounting portion 18' thereof and the bushing 74 guides the lock shaft 70 during motion of the carriage means 22.

For the condition of the carriage means 22 in the retracted position thereof and the cassette well 16 in the tape cassette insertion removal position thereof, which condition is illustrated on FIG. 2, the interlock means 64 also comprises carriage motion limiting means, generally designated 78, for preventing motion of the carriage means 22 from the retracted position to the read-write position thereof for the condition of the cassette well 16 in other than the read-write position thereof. In the embodiment 10 of the present invention this is achieved by providing that the second end 70'' of the lock shaft 70 abuts against a lock shaft stop means 78 movably mounted on the main frame 18 for movement in the direction of the first linear axis 20 and with the cassette well 16. The lock shaft stop means 78 comprises a block means 80 having an upper surface 82 engaging a bushing retaining portion 84 of the cassette well 16 and a stop surface 86 for slidingly engaging the second end 70'' in the lock shaft 70. The block means 80 also comprises a stem portion 88 extending through a stem bushing 90 in the main frame 18 at the cassette well mounting portion 18' thereof and also incorporates a head 92 abutting against a bushing retainer 94. A block spring means 96 is intermediate the main frame 18 and the block means 80 and yieldingly urges the block means 80 into contact with the bushing retaining portion 84 of the cassette well 16. Thus, the block means moves with the cassette well 16 during its motion along the first linear axis 20 under the influence of spring means 96. The block means 80 prevents motion of the carriage means 22 from the retracted position to the read-write position thereof along the second linear axis 24 for the cassette well 16 in other than the read-write position thereof.

The bushing retaining portion 84 of the cassette well 16 incorporates a bushing 98 adapted to receive the second end 70'' of the lock shaft 70 for the condition of the cassette well 16 in the read-write position thereof. Thus, when the cassette well 16 moves from the tape cassette insertion and removal position shown in FIG. 2 to the read-write position thereof along the first linear axis 20, the bushing 96 is aligned with the lock shaft 70 and the lock shaft 70 enters the bushing 98 when the carriage means 22 is moved from the retracted position to the read-write position thereof. This provides a double locking structure for the condition of the cassette well 16 and the carriage means 22 in the read-write position thereof. This double lock is provided by the insertion of the lock shaft 70 into the bushing 98 and by the engagement of the latch means 66 in the latched position with the lip 68 of the cassette well 16.

Figure 4:
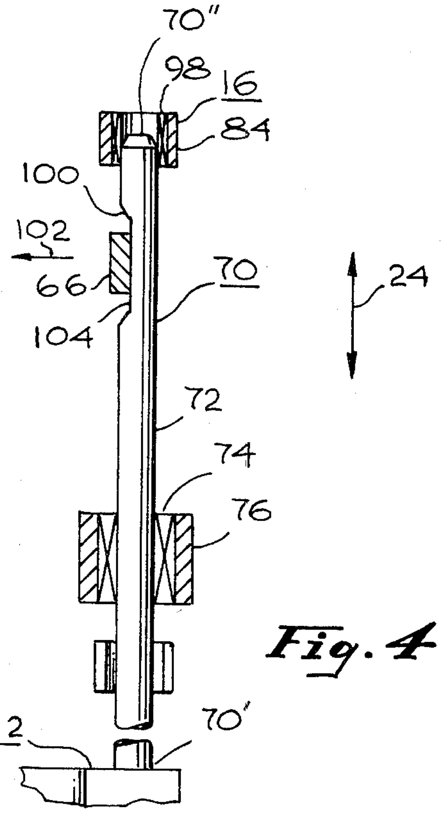
FIG. 4 is a sectional view along the line 4—4 of FIG. 3.

FIG. 4 illustrates the retaining means 69 and shows engagement of the lock shaft 70 with the latch means 66, the bushing 98 in the cassette well 16, and the bushing 74 on the main frame 18. As shown on FIG. 4, which illustrates the cassette well 16 and the carriage means 22 in the read-write positions thereof, the second end 70'' of the lock shaft 70 extends into the bushing 98 and restrains the cassette well 66 from any motion along the first linear axis 20. As the carriage means 22 is moved from the read-write position thereof towards the retract position along the second linear axis 24, the second end 70'' slides out of engagement with the bushing 98. However, as noted above, the latch means 66 is still in the latched position and engaging the lip means 68 on the cassette well 16. Therefore, the cassette well 16 is still restrained from motion along the first linear axis 20.

The interlock means 64 also comprises latch release means 71 and movement of the carriage means 22 towards the fully retracted position thereof along the second linear axis 24 forces the shoulder 100 of the lock shaft 70 into initial engagement with the latch means 66. Further movement of the carriage means 22 towards the retracted position forces the latch means 66 from the latched position, shown in FIG. 4, outwardly in the direction indicated by the arrow 102 to an unlatched position. When the latch means 66 is in the unlatched position it is free of the lip portion 68 of the cassette well 16 and the cassette well 16 moves in the direction parallel to the first linear axis 20 to the tape cassette insertion removal position. As noted below in greater detail, the carriage means 22 is spring biased for movement from the retracted position towards the cassette well. As the cassette well 16 moves into the tape cassette insertion removal position the second end 70'' of the lock shaft 70 engages the stop means 80 as shown on FIG. 2. For the position shown on FIG. 2 the latch means 66 is positioned against the detent portion 104 of the lock shaft 70 and is in a latched position thereof. As the cassette well 16 moves towards the read-write position thereof the shoulder portion 68 engages the latch means 66 forcing the latch means 66 outwardly in the direction indicated by the arrow 102 and, as noted above, the latch means 66 is yieldingly urged into the latched position and snaps into place on the lip portion 68 when the cassette well 16 reaches the read-write position thereof. Simultaneously the bushing 98 in the bushing retaining portion 84 is aligned with the lock shaft 70 and the lock shaft 70 slides therein to the position shown in FIG. 4.

Thus, there is a double locking provided for ensuring that there is no destructive contact of structural elements with the tape in the tape cassette 12 during any movement of the cassette well 16.

In the preferred embodiment 10 of the present invention the main frame 18 is a casting, the cassette well 16 is a casting and the carriage means 22 is a casting. Utilization of castings, and the preferred mounting of the components thereon, as described herein, ensure the field adjustments are not required.

Figure 5:
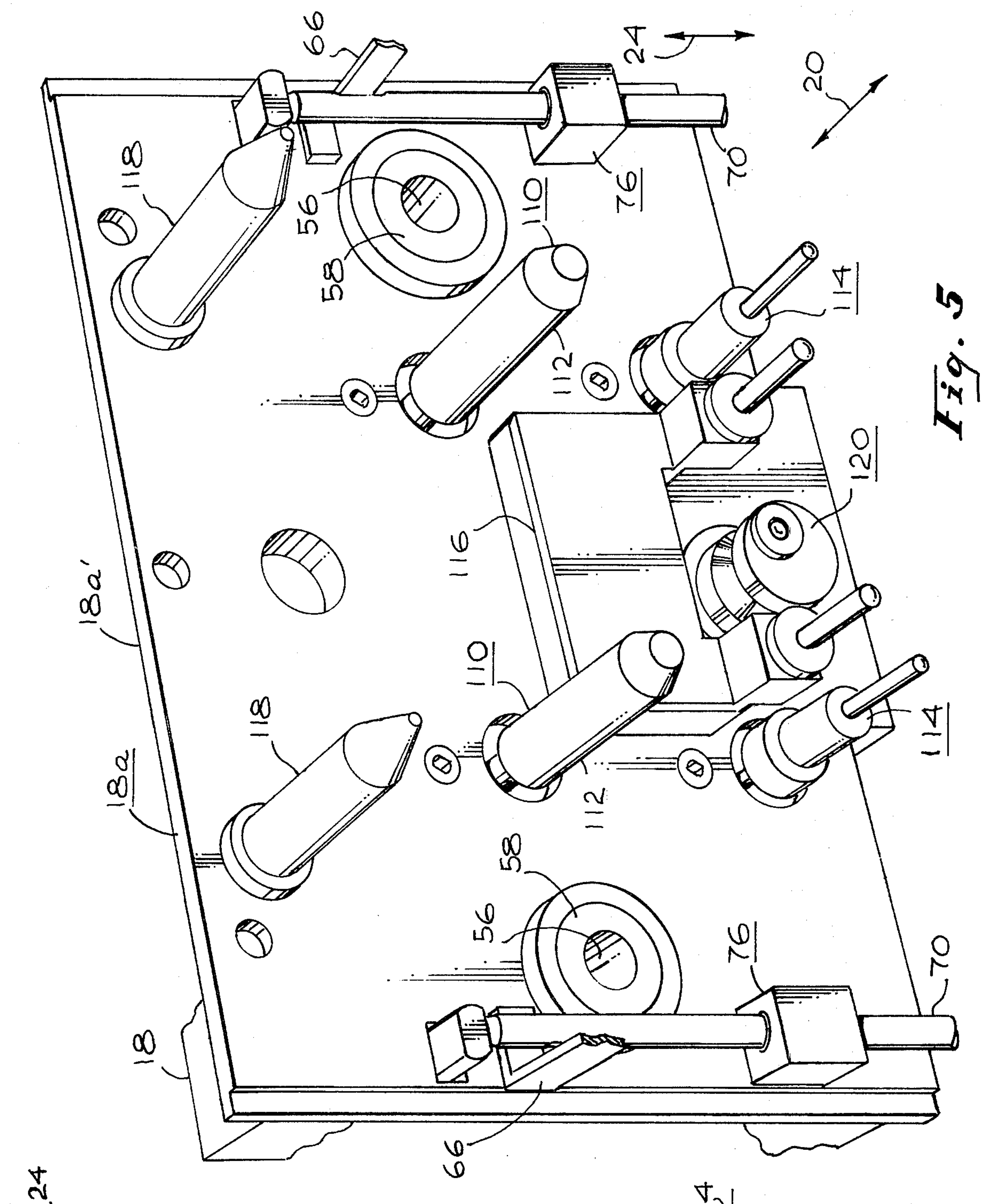
FIG. 5 is a perspective view of a portion of the embodiment of the invention shown in FIG. 1.

For convenience the main frame 18 may also comprise a deck portion **18*a* adjacent the cassette well 16** forming a part of the cassette well mounting portion 18'. All of the tape drive means 110, which in themselves do not form a part of the present invention, may be mounted on the deck portion 18*a*. FIG. 5 illustrates the deck portion 18*a* upon which the tape drive means, generally designated 110 is mounted. The tape drive means 110 drivingly engages the tape cassette 12, which together with the cassette well 16 has been omitted from FIG. 5 for clarity, for the cassette well in the read-write position thereof, and is free of contact or engagement with the tape cassette for the condition of the cassette well in the tape cassette insertion removal position thereof. The tape drive means 110 may include drive shafts 112 coupled to appropriate reel motors extending under the lower surface 18*a*' of the deck portion 18*a*, dual capstans 114 driven by capstan motors extending from the lower surface 18*a*', sensor block 116 and other structure associated with proper drive operation for a tape cassette 12.

A pair of post means 118, forming part of the cassette retaining means 31, are mounted on the deck plate portion 18*a* and frictionally engage the end 12' of the tape cassette 12 to urge the tape cassette into proper abutment relationship with the bearing wall 40 on the cassette well 16 for the cassette well 16 in the read-write position thereof. This prevents any rotational movement of the tape cassette 12 during the read-write operation as might be induced by reaction to the tape drive means 110.

A carriage motion stop means 120 is also coupled to the deck portion 18*a* and, as described below in greater detail, engages the carriage means 22 for limiting the forward movement of the carriage means 22 along the second linear axis 24 towards the cassette well 16 for the condition of the cassette well 16 in the read-write position thereof. The carriage motion stop means 120 is, in preferred embodiments of the present invention, adjustable in order to ensure that the carriage means 20 is in proper read-write relationship to the tape in the tape cassette 12 during the read-write operation. However, it will be appreciated, such adjustment is a single, factory adjustment that is not done in the field. The various tape cassette standardizing agencies have provided certain standardized functional tests defining the proper relationship of the read-write structure, described below in greater detail, and the tape in the tape cassette 12 and the stop means 120 is adjusted once at the time of assembly to ensure that the requirements of these standardized tests are achieved.

Figure 6:
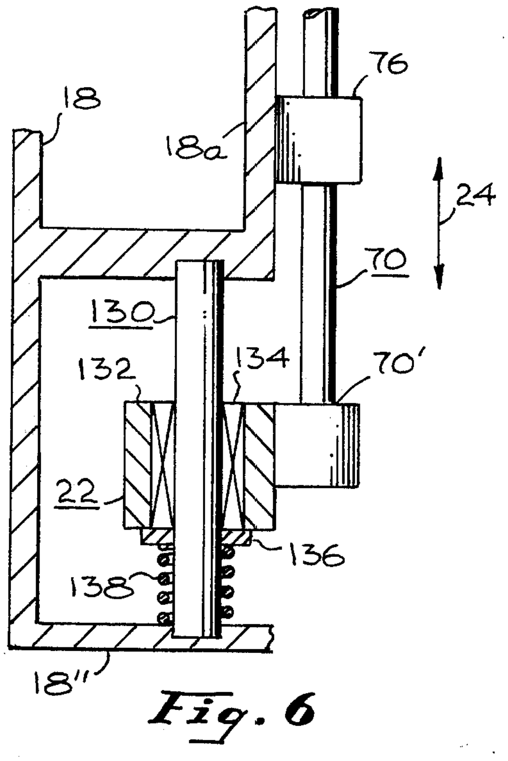
FIG. 6 is a sectional view of a portion of the embodiment of the invention shown in FIG. 1.

FIG. 6 illustrates the carriage guide means 125 for the mounting of the carriage means 22 on the main frame 18 in the carriage mounting portion 18'' thereof. As shown on FIG. 6 there is provided carriage shaft means 130 coupled to the main frame 18 in the carriage means mounting portion 18'' thereof. The carriage means 22 is provided with a bearing boss 132 in which a bearing 134 is mounted and retained in place by a bearing retainer 136. The carriage shaft means 130 extends through the carriage bearing means 134 and thus guides the carriage means 22 in the reciprocating motion along the second linear axis 24. The accuracy of movement of the carriage means 22 in the direction of the second linear axis 24 is maintained to the same degree as motion of the cassette well 16. Thus, parallelism of the carriage means 22 motion to the direction of the second linear axis 24 is not greater than 12 minutes of arc in azimuth and zenith deviation per inch of travel. Carriage spring means 138 engages the carriage means 22 and the main frame 18 for yieldingly urging movement of the carriage means 22 from the retracted position towards the read-write position thereof and yieldingly resists movement of the carriage means 22 from the read-write position towards the retracted position thereof. Thus, the carriage means 22 is spring biased towards the read-write position and the cassette well 16 is spring biased towards the tape cassette insertion removal position.

Figure 7:
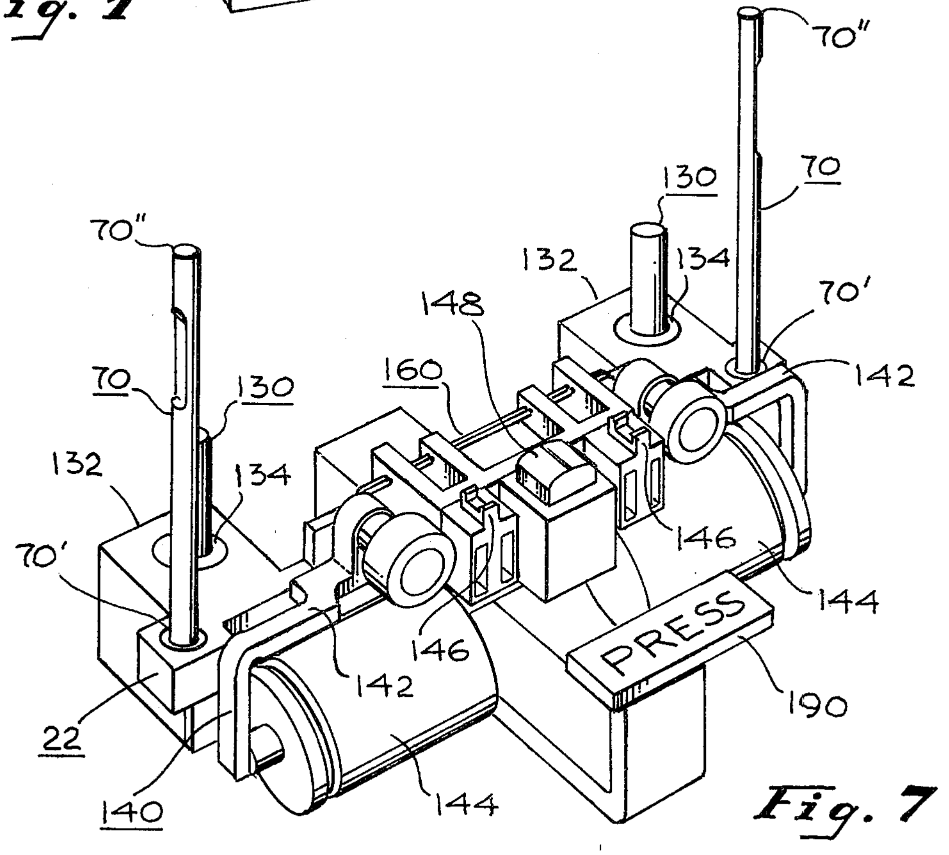
FIG. 7 is a perspective view of a portion of the embodiment of the invention shown in FIG. 1.

FIG. 7 is a perspective view of the carriage means 22. In the preferred embodiment 10 of the present invention all of the structure necessary for providing the read-write function and tape guide function are mounted on the carriage means 22 for movement therewith. The tape engaging means, generally designated 140 may be comprised of a pair of pinch rollers 142 which pinch the tape against the capstan 114 mounted on the deck portion 18*a* of the main frame 18 for the condition of the cassette well 16 and the carriage means 22 in the read-write position thereof. The pinch rollers 140 are activated by solenoids 144 and are spring biased by appropriate torsion springs (not shown) so that the pinch rollers are forced into tape engagement with the tape at the capstans 114 during read-write function but are free of engagement therewith when there is no read-write function in the particular direction of movement of the tape. The tape guide means also comprises a pair of substantially identical guide blocks 146 in spaced relationship and a tape read-write head 148 therebetween. The tape guide blocks are utilized to properly align the tape in the tape cassette 12 during the read-write function for proper positioning adjacent the read-write head 148.

Figure 8:
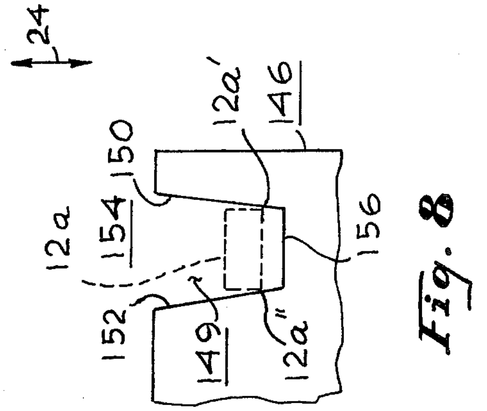
FIG. 8 illustrates a tape guide means useful in the practice of the present invention.

In preferred embodiments of the present invention each of the tapered guide blocks 146 have a tapered slot therein. FIG. 8 illustrates one embodiment of a tapered guide block 146 useful in the practice of the present invention. The slot 149 of the tapered guide blocks 146 have a planar top surface 150 and a planar bottom surface 152 extending between an entrance portion 154 and a base portion 156. The base portion 154 has a larger preselected dimension than the base portion 156 and the base portion 156 is aligned with the read-write head 148. A tape 12*a*, shown in dotted lines in FIG. 8, which may be contained in the tape cassette 12, is positioned within the tapered slot of the guide blocks 146 during the read-write function thereof. In the preferred embodiment of the present invention there is only line contact along a top edge 12*a*' and a bottom edge 12*a*'' of the tape 12*a* with the planar top surface 150 and planar bottom surface 152 of the slotted guide glocks 146. The tapered slot is preferred to allow for the tolerance in tape alignment provided in standardized tape cassettes and thus ensures proper alignment of the tape 12*a* with the tape read-write head 148. Limiting contact between the tape 12*a* and the slotted guide block 146 to the edges 12*a*' and 12*a*'' minimizes any distortion or inaccuracies during the tape read-write function.

Figure 9:
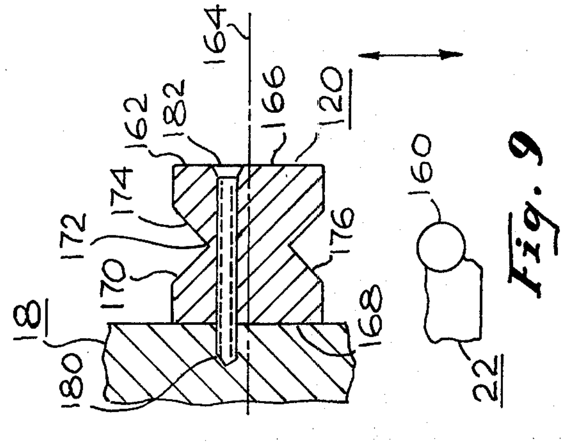
FIG. 9 illustrates a carriage motion stop means useful in the practice of the present invention.

The carriage motion stop means 120 shown above also comprises a cylindrical bar means 160 mounted on the carriage means 22. FIG. 9 illustrates the relationship between the cylindrical bar means 160 and a preferred body member 162 comprising the carriage motion stop means 120. While this structure is utilized in the preferred embodiment 10 it will be appreciated that any other form of stop means for stopping the travel of the carriage means 22 towards the cassette well 16, whether adjustable or not, could equally well be utilized. In the preferred embodiment of the carriage motion stop means 120, however, as shown on FIG. 9, the body member 162 is generally cylindrical about an axis 164 and is provided with a top surface 166, a bottom surface 168 coupled to the main frame 18, and side walls 170 defining a tapered groove 172 therearound. The tapered groove 172 thereby defines a pair of frusto-conical portions 174 and 176 having a predetermined pitch diameter therebetween. Coupling means, such a screw means 180 extends through an aperture 182 through the cylindrical body member 162 from the top surface 166 through the bottom surface 168 and into the main frame 18 for securing the cylindrical body member thereto. The aperture 182 is radially spaced from the axis 164. Thus, the cylindrical body member 162 may be rotated towards or away from the carriage means 22 about the axis of the screw means 180 to provide the proper positioning of the carriage means 22 in the read-write position.

In the preferred embodiment of the present invention the frusto-conical portions 174 and 176 have a 45° cone angle and the cylindrical bar 160, which is coupled to the carriage means 22, has a diameter equivalent to the pitch diameter defined thereby. As the carriage means 22 moves from the retracted position to the read-write position the cylindrical bar 160 enters the tapered slot 172 and contacts the frusto-conical portions 174 and 176 on the pitch diameter defined therebetween. This eliminates any backlash and properly positions the carriage means 22 in the desired read-write position thereof.

Operation of embodiment 10 may be accomplished with one hand. Starting with the tape transport 10 in the position shown in FIG. 1 the tape cassette 12 with the lips 14 thereon is inserted into the cassette well 16. The spring means 48 yieldingly urge the tape cassette 12 into engagement with the bearing surface 42. The cassette well 16 may then be pushed with one hand from the tape cassette insertion removal position shown in FIG. 1 along the first linear axis 20 towards the read-write position thereof. As the cassette well 16 approaches the read-write position the latch means 66 engage the lip portion 68 and are momentarily deflected outwardly thereby and then latch on the lip portion 68. The lock shaft 70 simultaneously slides into the bushings 98. This occurs automatically since the latch means 66 are spring loaded and urged into the latched position and the carriage means 22 is spring biased by springs 138 for movement towards the cassette well 16. Movement of the carriage means 22 is stopped by the carriage motion stop means 120 and the tape read-write and tape guide means mounted on the carriage means 22 are in proper functional position with relationship to the tape contained within the tape cassette 12. Similarly, as the cassette well 16 is placed into the read-write position thereof, the tape drive means 110 properly engages the tape cassette 12 for proper drive operation thereof.

When it is desired to change the tape cassette 12 the handle 190 coupled to the carriage means 22 is pressed, moving the carriage from the read-write position thereof along the second linear axis 24 towards the retracted position against the force of the spring means 138. The second end 70'' of lock shaft 70 slides out of the bushing 98 leaving the cassette well 16 restrained by only the latches 66. As the shoulders 100 on the lock shaft 70 engage the latches 66 they are forced yieldingly outwardly to the unlatched position and under the urging of the springs 60 the cassette well 16 is moved from the read-write position thereof to the tape cassette insertion removal position and out of contact with the tape drive means 110.

It will be appreciated that the tape guide means 140 on the carriage means 22 is moved out of contact with the tape in the tape cassette 12 when in the retracted position of the carriage means 22 thus preventing any damage to the tape during motion of the cassette well between the read-write position thereof and the tape insertion removal position. Thus, the lock shaft 70 and latch means 66 together comprise a retaining means for operatively engaging the cassette well and the carriage means for retaining the carriage means in the read-write position for the condition of the cassette well in the read-write position and allowing movement of the cassette well 16 from the read-write position thereof to the tape insertion removal position for the condition of the carriage means 22 in the retracted position. The carriage motion limiting means comprising the engagement of the second end 70'' of lock shaft 70 with the block means 80 prevents movement of the carriage means 22 into the read-write position thereof for the condition of the cassette well 16 in anything other than the read-write position thereof. This is necessary in order to prevent inadvertent damage to the tape contained within the tape cassette 12 by the tape guide means 140 mounted on the carriage means 22.

The carriage bearing means 134 and carriage shaft means 130 are similar to the cassette well shaft means 52 and cassette well bearing means 56 in that they limit deviation from perpendicularity of movement of the carriage means 22 along the second linear axis 24 to less than, for example, 12 minutes of arc in azimuth and zenith for each inch of travel.

From the above it can be seen that there has been provided an improved tape transport arrangement particularly adaptable for utilization in industrial applications involving standardized tape cassettes. Many variations and adaptations may be made of the structure defined above which has been presented for illustrative purposes of a preferred embodiment thereof. For example, the lock shaft stop means 78 could be eliminated and the lock shaft 70 could be restrained from movement by sliding frictional engagement with an extension of the bushing retaining portion 84 of the cassette well 16 extending sufficiently far to engage the second end 70'' of the lock shaft 70. Further, if desired, release of the latches 66 may be made a separate manual operation by including handle means on the lock shaft 70 and protrusions on the lock shaft 70 and having the lock shaft 70 rotatably mounted on the carriage means 22. In such an embodiment the handles may be manually operated and the lock shaft rotated until the protrusions force the latches 66 outwardly to the unlatched position. The handles may be rotated back to move the protrusions out of engagement with the latch means and the latch means may then assume the latched position. The latch means 66 described above is made of a flexible resiliently yieldable material. However, spring loaded latch means could equally well be utilized. Thus, the above and other modifications and adaptations which may be incorporated by those skilled in the art in the practice of the present invention are within the scope of the appended claims.

It will be appreciated that certain portions of the above-described structure may be utilized in other tape transport arrangements. Thus, the tape cassette retaining means may be utilized in tape transports not incorporating the other structural features above described. Similarly, the particular form of the carriage motion stop means and/or the tape guide means may also be utilized separate and apart from the other structure of the present invention.

I claim:

1. A tape cassette transport arrangement comprising, in combination:

a main frame having a cassette well mounting portion and a carriage mounting portion;

a cassette well adapted to have a tape cassette removably mounted therein movably mounted on said cassette well mounting portion of said main frame for reciprocating motion between a tape cassette insertion-removal position and a read-write position and along a first linear axis;

cassette well guide means operatively engaging said cassette well mounting portion of said main frame and said cassette well for controlling movement of said cassette well along said first linear axis;

latch means coupled to said cassette well mounting portion of said main frame and operatively engaging said cassette well and having a latched position for restraining said cassette well in said read-write position, and an unlatched position, and said cassette well free to move along said first linear axis for said latch means in said unlatched position;

a carriage means movably mounted on said carriage mounting portion of said main frame for reciprocating motion towards and away from said cassette well between a read-write position wherein said carriage means is in tape read-write relationship to a tape in a tape cassette removably mounted in said cassette well for the condition of said cassette well in said read-write position thereof, and a retracted position free of contact with the tape in the tape cassette for the condition of said cassette well in said tape cassette insertion removal position, and said carriage means movable along a second linear axis extending in directions different from said first linear axis;

carriage guide means operatively engaging said carriage mounting portion of said main frame and said carriage means for controlling movement of said carriage along said second axis; and retaining means operatively engaging said cassette well and said carriage means, and having a first position for retaining said carriage means in said read-write position thereof for the condition of said cassette well in said read write position thereof, and a second position allowing movement of said cassette well from said read-write position thereof to said tape cassette insertion removal position for the condition of said carriage means in said retracted position.

2. The arrangement defined in claim 1 and further comprising:

carriage motion limiting means operatively engaging said carriage means for preventing motion of said carriage means from said retracted position to said read-write position for the condition of said cassette well in said tape cassette insertion removal position.

3. The arrangement defined in claim 1 wherein:

said second linear axis extends in directions substantially perpendicular to said first linear axis;

motion of said carriage means along said second linear axis is maintained perpendicular to said first linear axis within less than 12 minutes of arc deviation in azimuth and zenith per inch of linear travel thereof; and motion of said cassette well along said first linear axis is maintained perpendicular to said second linear axis within less than 12° of arc deviation in azimuth and zenith per inch of travel thereof.

4. The arrangement defined in claim 1 wherein:

said second linear axis extends in directions substantially perpendicular to said first linear axis;

said cassette well guide means further comprises:

cassette well shaft means coupled to said cassette well and extending therefrom in directions parallel to said first axis;

cassette well bearing means mounted on said cassette well mounting portion of said main frame and said cassette well shaft means extending through said cassette well bearing means for guiding said reciprocating motion of said cassette well in directions parallel to said first linear axis;

casette well spring means engaging said cassette well and said main frame for yieldingly urging movement of said cassette well from said read-write position thereof towards said tape cassette insertion removal position, and resiliently resisting movement of said cassette well from said tape cassette insertion removal position towards said read-write position thereof.

5. The arrangement defined in claim 1 wherein:

said latch means is resiliently flexible and yieldingly urged into said latched position thereof and yieldingly resisting motion from said latched position to said unlatched position thereof.

6. The arrangement defined in claim 4 wherein:

said carriage guide means further comprises:

carriage shaft means coupled to said main frame and aligned substantially parallel to said second axis;

carriage bearing means mounted on said carriage means, and said carriage shaft means extending through said carriage bearing means for guiding said reciprocating motion of said carriage means in directions parallel to said second linear axis; and carriage spring means engaging said carriage means and said main frame for yieldingly urging movement of said carriage means from said retracted position towards said read-write position thereof, and yieldingly resisting movement of said carriage means from said read-write position towards said retracted position.

7. The arrangement defined in claim 6 and further comprising:

carriage motion limiting means operatively engaging said carriage means for preventing motion of said carriage means from said retracted position to said read-write position for the condition of said cassette well in said tape cassette insertion removal position;

and said retaining means further comprises:

lock shaft means having a first end coupled to said carriage means, a second end spaced a preselected distance therefrom, and a body portion intermediate said first end and said second end, and said lock shaft means movable with said carriage means.

bushing means mounted on said cassette well means and aligned with said lock shaft means for slidingly accepting said second end of said lock shaft means therein for the conditions of said cassette well and said carriage means in said read-write positions thereof, and said second end of said lock shaft means free of said bushing means for said carriage means in said retracted position thereof.

8. The arrangement defined in claim 7 wherein said carriage motion limiting means further comprises:

lock shaft stop means movable with said cassette well means and adjacent said bushing means for sliding engagement with said second end of said lock shaft means for said cassette well in said tape cassette insertion removal position and said carriage means in said retracted position to prevent movement of said carriage means towards said cassette well.

9. The arrangement defined in claim 8 wherein said lock shaft stop means further comprises:

block means comprising:

a base portion having an upper surface engaging said cassette well adjacent said bushing means, and a stop surface for slidingly engaging said second end of said lock shaft means; and a stem portion extending from said base portion towards said main frame;

stem bushing means on said main frame aligned with said stem portion of said block means for accepting said stem portion therein; and block spring means engaging said block means and said main frame for yieldingly urging said block means into contact with said cassette well.

10. The arrangement defined in claim 7 wherein:

said latch means is resiliently flexible and yieldingly urged into said latched position and yieldingly resisting movement from said latched position to said unlatched position; and said lock shaft means further comprises:

latch trip means on said body portion thereof for moving said latch means from said latched position to said unlatched position for the condition of said second end of said lock shaft means free of said bushing means on said cassette well.

11. The arrangement defined in claim 1 and further comprising:

tape engaging means mounted on said carriage means for movement therewith for engaging the tape in the tape cassette mounted in said cassette well for the condition of said carriage means in said read-write position thereof, and free of contact with the tape for said carriage means in said retracted position thereof, and said tape engaging means comprising a tape read-write head, tape guide means, and pinch roller means.

12. The arrangement defined in claim 11 wherein said tape guide means further comprises:

a pair of substantially identical slotted guide blocks in spaced relationship, and said read-write head intermediate said pair of slotted guide blocks;

each of said pair of slotted guide blocks comprising:

a tapered slot therein having a planar top and planar bottom surface extending between an entrance portion and a base portion thereof, and said entrance portion having a first preselected dimension and said base portion having a second preselected dimension less than said first preselected dimension, and said base portion in a preselected alignment with said read-write head; and said planar top surface and said planar bottom surface engaging the tape in the tape cassette.

13. The arrangement defined in claim 12 wherein:

said planar top surface and said planar bottom surface of said slotted guide blocks engage a top edge and a bottom edge, respectively, of the tape in the tape cassette and are substantially free of other contact with the tape.

14. The arrangement defined in claim 1 and further comprising:

carriage motion stop means coupled to said main frame and engaging said carriage means for stopping movement of said carriage means towards said cassette well for said cassette well in said read-write position.

15. The arrangement defined in claim 14 wherein said carriage motion stop means further comprises:

a generally cylindrical body member having a predetermined axis, a top surface, a bottom surface, and side walls defining a tapered groove extending around the periphery of said body member and defining a pair of substantially frustro-conical portions having a common apex diameter intermediate said top surface and said bottom surface, and defining a pitch diameter therebetween;

coupling means for mounting said body member on said main frame;

cylindrical bar means mounted on said carriage means for movement therewith, and said cylindrical bar means having a predetermined diameter corresponding to said pitch diameter of said body member, and said cylindrical bar means aligned with said body member for contact therewith at said pitch diameter thereof for the condition of said carriage means in said read-write position thereof.

16. The arrangement defined in claim 15 wherein said body member of said carriage motion stop means further comprises:

second walls defining an aperture therethrough extending from said top surface to said bottom surface thereof, and said aperture having an axis parallel to said predetermined axis of said body member, and said aperature spaced radially outwardly from said predetermined axis of said body member;

said coupling means further comprises:

screw means extending through said aperature in said body member and threadingly engaging said main frame.

17. The arrangement defined in claim 16 wherein:

said side walls of said body member define a 45° cone angle.

18. The arrangement defined in claim 1 wherein said cassette well further comprises:

tape cassette retaining means for removably retaining the tape cassette in a predetermined position therein.

19. The arrangement defined in claim 18 wherein said tape cassette retaining means further comprises:

a tape cassette bearing surface on said cassette well;

a tape cassette bearing wall on said cassette well; and said tape cassette bearing wall extending from said tape cassette bearing surface a predetermined distance;
guide walls in said cassette well defining guide lip accepting slot means for accepting guide lips on the tape cassette;
cover means mounted on said cassette well in spaced relationship to said tape cassette bearing surface thereof and spaced therefrom;
spring means intermediate said cover means and said tape cassette bearing surface for yieldingly urging the tape cassette against said tape cassette bearing surface; and
post means mounted on said cassette well mounting portion of said main frame and engaging the tape cassette mounted in said cassette well for the condition of said cassette well in said read-write position, and said post means urging the tape cassette into contact with said tape cassette bearing wall.

20. The arrangement defined in claim 1 wherein:
said main frame comprises a casting, and said main frame has a deck plate portion adjacent said cassette well mounting portion thereof;
said cassette well comprises a casting;
said carriage means comprises a casting;
and further comprising:
tape drive means mounted on said deck plate portion of said main frame for drivingly engaging the tape and the tape cassette removably mounted in said cassette well for the condition of said cassette well in said read-write position thereof, and said tape drive means free of engagement with the tape cassette for the condition of said cassette well in said tape insertion removal position; and
tape read-write means mounted on said carriage means for engaging the tape in read-write relationship thereto for said carriage means in said read-write position thereof, and free of engagement with the tape for said carriage means in said retracted position thereof.

21. A tape cassette retaining structure of the type adapted to retain a tape cassette in a predetermined position in a tape transport and a tape cassette of the type having predetermined dimensions and guide lips on oppositely disposed external surfaces thereof and comprising, in combination:
a cassette well adapted to receive the tape cassette therein, and said cassette well movably mounted in the tape transport between a tape cassette insertion removal position wherein the tape cassette may be inserted and removed from the cassette well and a tape read-write position wherein a tape in the tape cassette is in operative position for tape read-write functions, and said cassette well further comprising:
a tape cassette bearing surface;
a tape cassette bearing wall extending from said cassette bearing surface;
guide walls in said cassette well defining guide lip accepting slot means for accepting guide lips on the tape cassette;
cover means mounted on said cassette well and in spaced relationship to said tape cassette bearing surface thereof and spaced therefrom;
spring means intermediate said cover means and said tape cassette bearing surface for yieldingly urging the tape cassette against said tape cassette bearing surface; and
post means mounted on the tape transport and operatively engaging the tape cassette mounted in said cassette well for the condition of said cassette well in said read-write position, and said post means urging the tape cassette into contact with said tape cassette bearing wall.

* * * * *